US008935217B2

(12) United States Patent
Suitts et al.

(10) Patent No.: US 8,935,217 B2
(45) Date of Patent: Jan. 13, 2015

(54) DIGITAL ASSET VALIDATION PRIOR TO SUBMISSION FOR NETWORK-BASED DISTRIBUTION

(75) Inventors: Jason Robert Suitts, San Francisco, CA (US); David Makower, Milpitas, CA (US); Ricardo D. Cortes, Los Gatos, CA (US); Max Muller, San Jose, CA (US); Juan Carlos Jimenez, Campbell, CA (US); Jeremy Brown, San Francisco, CA (US); Jason Fosback, Edmonds, WA (US)

(73) Assignee: Apple Inc., Cupertino, CA (US)

( * ) Notice: Subject to any disclaimer, the term of this patent is extended or adjusted under 35 U.S.C. 154(b) by 439 days.

(21) Appl. No.: 12/555,624

(22) Filed: Sep. 8, 2009

(65) Prior Publication Data

US 2011/0060776 A1   Mar. 10, 2011

(51) Int. Cl.
*G06F 17/30* (2006.01)
*H04L 29/06* (2006.01)
*H04L 29/08* (2006.01)

(52) U.S. Cl.
CPC .............. *H04L 63/123* (2013.01); *H04L 67/06* (2013.01)
USPC .............. 707/687; 707/690; 705/50; 709/229

(58) Field of Classification Search
CPC . G06F 17/30017; G06F 17/3089; G06F 8/65; H04N 21/2353
See application file for complete search history.

(56) References Cited

U.S. PATENT DOCUMENTS

| | | |
|---|---|---|
| 4,750,119 A | 6/1988 | Cohen et al. |
| 5,253,165 A | 10/1993 | Leiseca et al. |
| 5,410,598 A | 4/1995 | Shear |
| 5,535,383 A | 7/1996 | Gower |
| 5,627,973 A | 5/1997 | Armstrong et al. |
| 5,752,128 A | 5/1998 | Yamashita |
| 5,765,152 A | 6/1998 | Erickson |
| 5,884,280 A | 3/1999 | Yoshioka et al. |
| 5,943,422 A | 8/1999 | Van Wie et al. |
| 6,067,531 A | 5/2000 | Hoyt et al. |
| 6,085,253 A | 7/2000 | Blackwell et al. |
| 6,151,643 A | 11/2000 | Cheng |
| 6,226,618 B1 | 5/2001 | Downs et al. |

(Continued)

FOREIGN PATENT DOCUMENTS

| | | |
|---|---|---|
| EP | 1 684 223 A1 | 7/2006 |
| EP | 2 230 620 A1 | 9/2010 |

(Continued)

OTHER PUBLICATIONS

"Liquifier Pro 4.0 for Windows™ User's Guide," 1998, Liquid Audio, Inc.

(Continued)

*Primary Examiner* — Anh Tai Tran

(57) ABSTRACT

A system and method for submission of digital assets to a digital asset submission system are disclosed. The digital asset submission system can manage submissions of digital assets to a network-based distribution system. Submission of digital assets to the digital asset submission system can be performed over a network in a controlled manner such that the digital assets can be validated prior to transmission of the digital assets to the digital asset submission system. Advantageously, digital assets to be submitted for distribution can be substantially validated before the digital assets are transmitted to the digital asset submission system.

22 Claims, 8 Drawing Sheets

(56) References Cited

U.S. PATENT DOCUMENTS

| | | |
|---|---|---|
| 6,233,682 B1 | 5/2001 | Fritsch |
| 6,263,313 B1 | 7/2001 | Milsted |
| 6,275,954 B1 | 8/2001 | Herman et al. |
| 6,330,670 B1 | 12/2001 | England et al. |
| 6,338,044 B1 | 1/2002 | Cook et al. |
| 6,341,353 B1 | 1/2002 | Herman et al. |
| 6,345,256 B1 | 2/2002 | Milsted et al. |
| 6,363,486 B1 | 3/2002 | Knapton |
| 6,363,488 B1 | 3/2002 | Ginter et al. |
| 6,385,596 B1 | 5/2002 | Wiser et al. |
| 6,389,592 B1 | 5/2002 | Ayres et al. |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,591,420 B1 | 7/2003 | McPherson et al. |
| 6,658,476 B1 | 12/2003 | Van |
| 6,691,149 B1 | 2/2004 | Yokota et al. |
| 6,731,312 B2 | 5/2004 | Robbin |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,938,005 B2 | 8/2005 | Iverson et al. |
| 7,073,193 B2 | 7/2006 | Marsh |
| 7,076,445 B1 | 7/2006 | Cartwright |
| 7,209,892 B1 | 4/2007 | Galuten et al. |
| 7,275,243 B2 | 9/2007 | Gibbons et al. |
| 7,292,980 B1 | 11/2007 | August et al. |
| 7,308,413 B1 | 12/2007 | Tota et al. |
| 7,383,233 B1 | 6/2008 | Singh et al. |
| 7,624,046 B2 | 11/2009 | Galuten et al. |
| 7,685,512 B2 | 3/2010 | Hanson et al. |
| 7,729,946 B2 | 6/2010 | Chu |
| 7,739,256 B2 | 6/2010 | Powell |
| 7,756,920 B2 | 7/2010 | Muller et al. |
| 7,827,162 B2 | 11/2010 | Suitts et al. |
| 7,844,548 B2 | 11/2010 | Robbin et al. |
| 7,860,830 B2 | 12/2010 | Mirrashidi et al. |
| 7,962,634 B2 | 6/2011 | Cortes et al. |
| 8,015,237 B2 | 9/2011 | Muller et al. |
| 2001/0021926 A1 | 9/2001 | Schneck et al. |
| 2001/0037207 A1 | 11/2001 | Dejaeger |
| 2001/0044786 A1 | 11/2001 | Ishibashi |
| 2001/0054046 A1 | 12/2001 | Mikhailov et al. |
| 2002/0002541 A1 | 1/2002 | Williams |
| 2002/0004824 A1* | 1/2002 | Cuan et al. .................... 709/208 |
| 2002/0032658 A1 | 3/2002 | Oki et al. |
| 2002/0047899 A1 | 4/2002 | Son et al. |
| 2002/0049844 A1 | 4/2002 | Nishikawa |
| 2002/0073177 A1 | 6/2002 | Clark et al. |
| 2002/0077986 A1 | 6/2002 | Kobata et al. |
| 2002/0078211 A1 | 6/2002 | Natarajan et al. |
| 2002/0082857 A1 | 6/2002 | Skordin et al. |
| 2002/0087440 A1 | 7/2002 | Blair et al. |
| 2002/0091584 A1 | 7/2002 | Clark et al. |
| 2002/0099661 A1 | 7/2002 | Kii et al. |
| 2002/0099696 A1 | 7/2002 | Prince |
| 2002/0099801 A1 | 7/2002 | Ishii |
| 2002/0107803 A1 | 8/2002 | Lisanke et al. |
| 2002/0112171 A1 | 8/2002 | Ginter et al. |
| 2002/0116293 A1 | 8/2002 | Lao et al. |
| 2002/0124182 A1 | 9/2002 | Bacso et al. |
| 2002/0143612 A1 | 10/2002 | Barik et al. |
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1 | 11/2002 | Ishii et al. |
| 2002/0186844 A1 | 12/2002 | Levy et al. |
| 2002/0198843 A1 | 12/2002 | Wang et al. |
| 2003/0005173 A1 | 1/2003 | Shah et al. |
| 2003/0033162 A1 | 2/2003 | Houssiaux et al. |
| 2003/0037242 A1 | 2/2003 | Yasuna et al. |
| 2003/0065717 A1 | 4/2003 | Saito et al. |
| 2003/0074465 A1 | 4/2003 | Tang et al. |
| 2003/0115144 A1 | 6/2003 | Stefik et al. |
| 2003/0120593 A1 | 6/2003 | Bansai et al. |
| 2003/0120928 A1 | 6/2003 | Cato et al. |
| 2003/0135424 A1 | 7/2003 | Davis et al. |
| 2003/0149742 A1 | 8/2003 | Bollerud |
| 2003/0182188 A1 | 9/2003 | Duchow |
| 2003/0208473 A1 | 11/2003 | Lennon et al. |
| 2003/0236886 A1 | 12/2003 | Oren et al. |
| 2004/0012618 A1 | 1/2004 | Finney |
| 2004/0015427 A1 | 1/2004 | Camelio |
| 2004/0015445 A1 | 1/2004 | Heaven |
| 2004/0034601 A1 | 2/2004 | Kreuzer |
| 2004/0039754 A1 | 2/2004 | Harple |
| 2004/0044949 A1 | 3/2004 | Rowe |
| 2004/0059929 A1 | 3/2004 | Rodgers et al. |
| 2004/0133605 A1 | 7/2004 | Chang et al. |
| 2004/0136698 A1 | 7/2004 | Mock et al. |
| 2004/0143760 A1 | 7/2004 | Alkove et al. |
| 2004/0148598 A1 | 7/2004 | Kita et al. |
| 2004/0153968 A1 | 8/2004 | Ching et al. |
| 2004/0167858 A1 | 8/2004 | Erickson |
| 2004/0181459 A1 | 9/2004 | Wright |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0254883 A1 | 12/2004 | Kondrk et al. |
| 2004/0254949 A1 | 12/2004 | Amirthalingam |
| 2004/0267552 A1 | 12/2004 | Gilliam et al. |
| 2004/0267608 A1 | 12/2004 | Mansfield, Jr. |
| 2004/0268451 A1 | 12/2004 | Robbin et al. |
| 2005/0015765 A1 | 1/2005 | Covell et al. |
| 2005/0021478 A1 | 1/2005 | Gautier et al. |
| 2005/0034164 A1 | 2/2005 | Sano et al. |
| 2005/0038813 A1 | 2/2005 | Apparao et al. |
| 2005/0050218 A1 | 3/2005 | Sheldon et al. |
| 2005/0050345 A1 | 3/2005 | Dowdy et al. |
| 2005/0071418 A1 | 3/2005 | Kjellberg et al. |
| 2005/0080743 A1 | 4/2005 | Ostrover et al. |
| 2005/0080788 A1 | 4/2005 | Murata |
| 2005/0144635 A1 | 6/2005 | Boortz |
| 2005/0165656 A1 | 7/2005 | Frederick et al. |
| 2005/0182792 A1 | 8/2005 | Israel et al. |
| 2005/0197946 A1 | 9/2005 | Williams et al. |
| 2005/0216472 A1 | 9/2005 | Leon et al. |
| 2005/0240529 A1 | 10/2005 | Thomas |
| 2005/0246159 A1 | 11/2005 | Perla et al. |
| 2005/0267894 A1 | 12/2005 | Camahan |
| 2005/0278375 A1 | 12/2005 | Mitchko et al. |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0041748 A1 | 2/2006 | Lockhart et al. |
| 2006/0048132 A1 | 3/2006 | Chen et al. |
| 2006/0062426 A1 | 3/2006 | Levy et al. |
| 2006/0074754 A1 | 4/2006 | Toyohara et al. |
| 2006/0107046 A1 | 5/2006 | Raley et al. |
| 2006/0112101 A1 | 5/2006 | Young |
| 2006/0143264 A1 | 6/2006 | Payne |
| 2006/0161604 A1 | 7/2006 | Lobo |
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0229929 A1 | 10/2006 | Hughes |
| 2006/0242640 A1 | 10/2006 | Pauly |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1 | 3/2007 | Borrett et al. |
| 2007/0073694 A1 | 3/2007 | Picault et al. |
| 2007/0083471 A1 | 4/2007 | Robbin et al. |
| 2007/0106522 A1 | 5/2007 | Collins |
| 2007/0108274 A1 | 5/2007 | Boardman et al. |
| 2007/0192352 A1 | 8/2007 | Levy |
| 2007/0208670 A1 | 9/2007 | Quoc |
| 2007/0220051 A1 | 9/2007 | Brentano et al. |

(56) References Cited

U.S. PATENT DOCUMENTS

| | | |
|---|---|---|
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1* | 11/2007 | Cortes et al. ............... 707/104.1 |
| 2008/0040379 A1 | 2/2008 | Suitts et al. |
| 2008/0071614 A1 | 3/2008 | Mebruer |
| 2008/0077850 A1 | 3/2008 | Gauthier et al. |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell |
| 2008/0147530 A1 | 6/2008 | Kwan et al. |
| 2008/0147558 A1 | 6/2008 | Kraus |
| 2008/0155552 A1 | 6/2008 | Kim |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmel et al. |
| 2009/0063543 A1 | 3/2009 | Martin et al. |
| 2009/0138117 A1 | 5/2009 | Bagwell et al. |
| 2009/0198830 A1 | 8/2009 | Zhang et al. |
| 2009/0240552 A1 | 9/2009 | Yang |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally |
| 2009/0307683 A1 | 12/2009 | Gharabally |
| 2010/0115443 A1 | 5/2010 | Richstein |
| 2010/0205274 A1 | 8/2010 | Gharabally et al. |
| 2010/0235254 A1 | 9/2010 | Chu et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0060776 A1 | 3/2011 | Suitts et al. |

FOREIGN PATENT DOCUMENTS

| | | |
|---|---|---|
| WO | WO 97/04410 | 2/1997 |
| WO | WO 98/49644 | 11/1998 |
| WO | WO 00/08909 | 2/2000 |
| WO | WO 02/48920 | 6/2002 |
| WO | WO 2004/019182 A2 | 3/2004 |

OTHER PUBLICATIONS

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb.html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc. http://www.avcataloger.com/Products.aspx, downloaded Oct. 6, 2003, pp. 1-4.

Jyri Huopaniemi, "Music Encoding and Transmission," CUIDAD meeting, ICMC '2000 Berlin, Aug. 28, 2000.

"Media Encoding FAQ," Loudeye Corp., http://www.loudeye.com/digitalmedia/solutions/mediaenchost/encodingfaq.asp, downloaded Oct. 9, 2003, pp. 1-3.

"Media encoding datasheet," Loudeye Corp., http://www.loudeye.com/digitalmedia/solutions/mediaenchost/encoding.asp, downloaded Oct. 9, 2003, pp. 1-4.

"Media hosting datasheet," Loudeye Corp. http://www.loudeye.com/digitalmedia/solutions/mediaenchost/hosting.asp, downloaded Oct. 9, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

Sonopress Global Network User Manual, Client Tools, Upload Data/Graphics Files to Sonopress, Sonopress, date unknown.

MPEG-7 Multimedia Description Schemes XM (Version 2.0), ISO/IEC, Mar. 2000, pp. 1-138.

"Digital Audio Best Practices Version 2.1", by Digital Audio Working Group, Oct. 2006, http:/www.mndigital.org.digitizing/standards/audio.pdf.

* cited by examiner

DIGITAL ASSET VALIDATION PRIOR TO SUBMISSION FOR NETWORK-BASED DISTRIBUTION

BACKGROUND OF THE INVENTION

1. Field of the Invention

The present invention relates to submission of digital assets and, more particularly, to electronic submission of digital assets for purposes of network-based distribution.

2. Description of the Related Art

Today, online stores, such as the iTunes™ Store provided by Apple Inc. of Cupertino, Calif., allow customers (i.e., online users) via the Internet to purchase or rent media items (such as music, videos) or software programs. Often, at online stores, numerous digital items are made available and are provided by various different providers, such as music labels, movie companies, and application developers. Software tools, such as iProducer™ and iTunes Connect™ available from Apple Inc., can assist providers with online submission of digital items to the iTunes™ Store.

Unfortunately, however, since submission involves transmission of digital files over the Internet to online stores for distribution, the submission process can be time consuming to a submitter. When the digital files are large or voluminous, the transmission of the digital files for the submission can take a substantial duration of time. For example, submission of a movie can take several hours. Even after the time consuming transmission has been endured, the digital files of the submission may fail validation checks. As a result, the submitter must correct the defects with respect to their prior submission and again attempt to submit the digital files. Consequently, there is a need for improved approaches to render submission of digital files to online stores in a more efficient and reliable manner.

Therefore, there is a need for improved approaches to facilitate submission of digital assets for online distribution.

SUMMARY OF THE INVENTION

A system and method for submission of digital assets to a digital asset submission system are disclosed. The digital asset submission system can manage submissions of digital assets to a network-based distribution system. Submission of digital assets to the digital asset submission system can be performed over a network in a controlled manner such that the digital assets can be validated prior to transmission of the digital assets to the digital asset submission system. Advantageously, digital assets to be submitted for distribution can be substantially validated before the digital assets are transmitted to the digital asset submission system. In one embodiment, a client computing device can initially provide a summary for one or more digital assets to be submitted. Then, a digital asset submission system can validate the one or more digital assets based on the summary and validation rules. If the digital asset submission system successfully validates the one or more digital assets, final submission (e.g., transmission) of the digital assets to the digital asset submission system is thereafter able to be performed. On the other hand, if the digital asset submission system does not successfully validate the one or more digital assets, final submission of the digital assets to the digital asset submission system is not performed.

The invention can be implemented in numerous ways, including as a method, system, device, apparatus (including computer readable medium and graphical user interface). Several embodiments of the invention are discussed below.

According to one embodiment, a method for validating a digital asset package via a server computer is disclosed. The digital asset package can include at least a metadata file and one or more digital asset files. The method can, for example, include the operations of: receiving an initial validation submission including at least the metadata file; validating metadata within the metadata file; determining at least one digital asset file identified in the metadata to be validated; sending an initial validation response including at least a list of the at least one digital asset file that is to be validated; receiving a subsequent validation submission including at least the metadata file and asset summary information for the at least one digital asset file; determining validation rules to be used in validating the at least one digital asset file; validating the at least one digital asset file based on the asset summary information and the determined validation rules; and sending a subsequent validation response in accordance with the validating of the at least one digital asset file.

According to one embodiment, a computer readable medium including at least computer program code stored thereon for validating a digital submission to a server computer via a data network is disclosed. The digital submission can include at least a metadata file and at least one digital asset file. The computer readable medium can, for example, include at least: computer program code for receiving an asset validation submission including at least the metadata file and asset summary information for the at least one digital asset file; computer program code for determining validation rules to be used in validating the at least one digital asset file; computer program code for validating the at least one digital asset file based on the asset summary information and the determined validation rules; and computer program code for sending a validation response based on the validating of the at least one digital asset file by the computer program code for validating the at least one digital asset file.

According to one embodiment, a method for submitting a digital asset package to a network-based server computer for validation is disclosed. The method can, for example, include at least the operations of: forming a digital asset package including at least a metadata file and digital asset files; sending an initial validation submission including the metadata file to the server computer; receiving an initial validation response from the server computer, where the initial validation response includes at least a list of at least one digital asset file that is to be described; producing at least one summary file for the at least one digital asset file that is to be described; sending a subsequent validation submission including the at least one summary file to the server computer; receiving a subsequent validation response from the submission server, the subsequent validation response including an indication of whether at least the at least one digital asset file has been successfully validated; and thereafter submitting the digital asset package to the server computer if the subsequent validation response indicates that at least the at least one digital asset file has been successfully validated.

According to one embodiment, a computer readable medium including at least computer program code stored thereon for submitting a digital asset package to a network-based server computer for validation is disclosed. The computer readable medium can, for example, includes at least: computer program code for forming a digital asset package including at least a metadata file and digital asset files; computer program code for producing at least asset summary information for at least one of the digital asset files of the digital asset package; computer program code for sending an asset validation submission including the asset summary information to the server computer; computer program code for receiving an asset validation response from the submission server, wherein the asset validation response includes an indication of whether at least the at least one digital asset file has been successfully validated at the server computer based on the asset summary information; and computer program code for submitting the digital asset package to the server computer if the asset validation response indicates that at least the at least one digital asset file has been successfully validated.

As a media system, one embodiment can include at least a digital package submission subsystem configured to submit a digital asset package, and a digital package reception subsystem configured receive and process to the digital asset package that has been submitted. The digital package submission subsystem and the digital package reception system can be connected via a computer data network. The digital package submission subsystem can be configured to at least: form a digital asset package including at least a metadata file and digital asset files, produce at least asset summary information for at least one of the digital asset files of the digital asset package, send an asset validation submission including the asset summary information to the digital package reception subsystem, and receive an asset validation response from the digital package reception subsystem. The asset validation response can include an indication of whether at least the at least one digital asset file has been successfully validated at the digital package reception subsystem based on the asset summary information. Additionally, the digital package submission subsystem can be configured to submit the digital asset package to the server computer if the asset validation response indicates that at least the at least one digital asset file has been successfully validated. The digital package reception subsystem is configured to at least: receive an asset validation submission including at least the metadata file and the asset summary information for the at least one digital asset file, determine validation rules to be used in validating the at least one digital asset file, validate the at least one digital asset file based on the asset summary information and the determined validation rules, and send a validation response in accordance with the validating of the at least one digital asset file by the computer program code for validating the at least one digital asset file.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

A system and method for submission of digital assets to a digital asset submission system are disclosed. The digital asset submission system can manage submissions of digital assets to a network-based distribution system. Submission of digital assets to the digital asset submission system can be performed over a network in a controlled manner such that the digital assets can be validated prior to transmission of the digital assets to the digital asset submission system. Advantageously, digital assets to be submitted for distribution can be substantially validated before the digital assets are transmitted to the digital asset submission system. In one embodiment, a client computing device can initially provide a summary for one or more digital assets to be submitted. Then, a digital asset submission system can validate the one or more digital assets based on the summary and validation rules. If the digital asset submission system successfully validates the one or more digital assets, final submission (e.g., transmission) of the digital assets to the digital asset submission system is thereafter able to be performed. On the other hand, if the digital asset submission system does not successfully validate the one or more digital assets, final submission of the digital assets to the digital asset submission system is not performed.

Embodiments of various aspects of the invention are discussed below with reference to FIGS. 1-5C. However, those skilled in the art will readily appreciate that the detailed description given herein with respect to these figures is for explanatory purposes as the invention extends beyond these limited embodiments.

Figure 1:
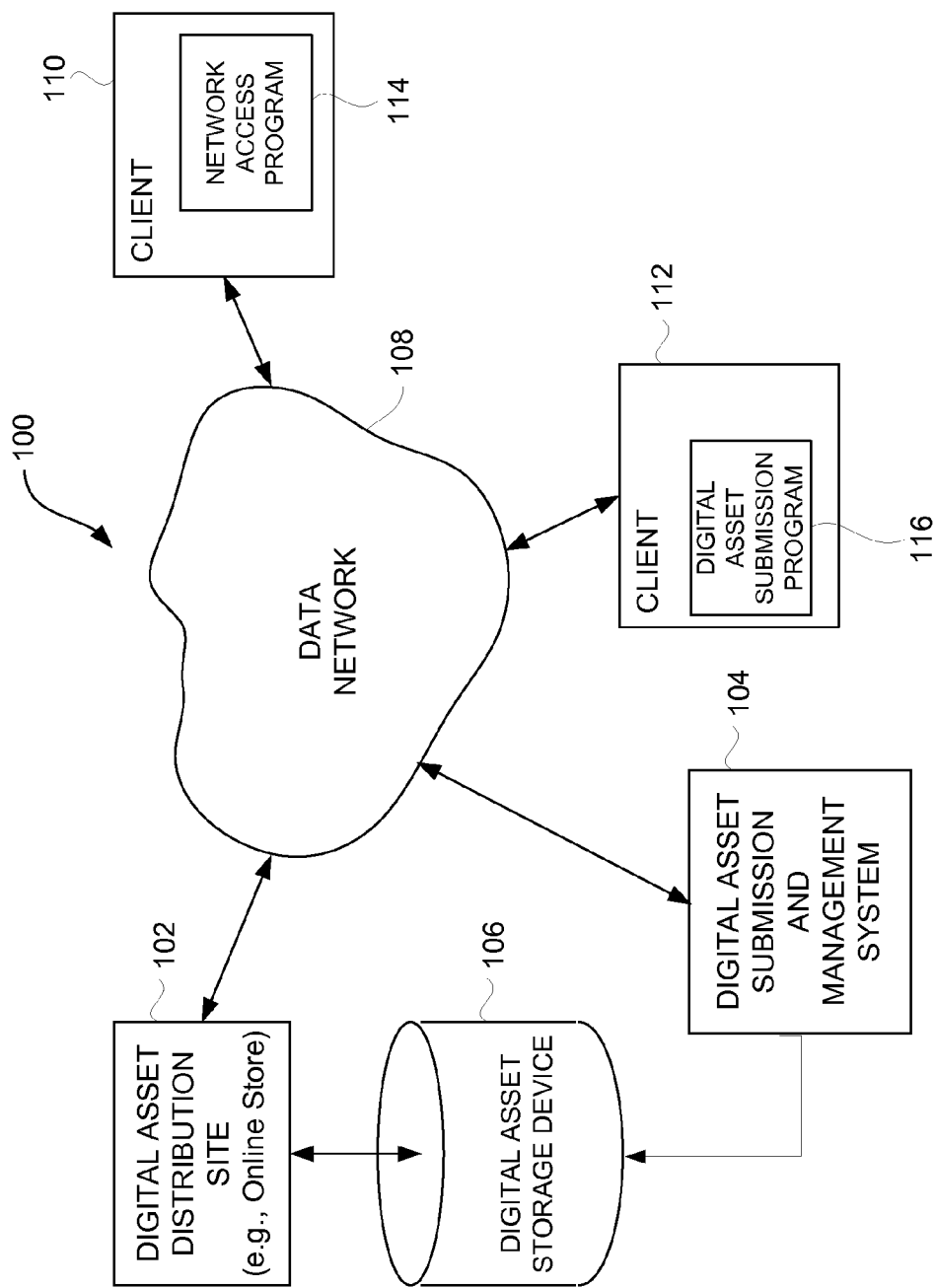
FIG. 1 is a block diagram of a digital asset submission and distribution system according to one embodiment of the invention.

FIG. 1 is a block diagram of a digital asset submission and distribution system 100 according to one embodiment of the invention. The digital asset submission and distribution system 100 includes a digital asset distribution site 102. The digital asset distribution site 102 provides an online access point for distribution of various digital assets. For example, the digital asset distribution site 102 can be referred to as an online store. A digital asset submission and management system 104 operates to receive submissions of digital assets from various digital asset submitters. The digital asset submission and management system 104 can process submission of digital assets and authorize distribution of approved digital assets. The digital assets can be stored in a digital asset storage device 106. In one embodiment, the digital asset storage device 106 includes a mass data store and one or more databases. The digital asset storage device 106 provides mass storage of the numerous digital assets that are available for distribution (e.g., purchase or rental). For example, digital assets that have been purchased can be accessed from the digital asset storage device 106 over a data network 108 by way of the digital asset distribution site 102. Examples of digital assets include digital media assets (e.g., media items) or computer program products. Digital media assets can pertain to music (e.g., songs or albums) or video (e.g., movies or television shows). Computer program products can pertain to applications (or application programs), animations, or presentations.

The digital asset submission and distribution system 100 also includes a first client 110 and a second client 112. Typically, the digital asset submission and distribution system 100 would include a plurality of different clients 110, 112. The first client 110 includes a network access program 114. The second client 112 includes a digital asset submission program 116. Some clients can also include both the network access program 114 and the digital asset submission program 116. The network access program 114 is an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 is coupled to the digital asset distribution site 102 through the data network 108. Hence, any of the first clients 110 can interact with the digital asset distribution site 102 to review, purchase and/or manage digital assets.

The digital asset submission program 116 is also an application program (e.g., software application) that operates on the second client 112, which is a computing device. The digital asset submission program 116 is used to submit digital assets to the digital asset submission and management system 104 for eventual distribution by the media distribution site 102. Although the network access program 114 and the digital asset submission program 116 are shown in FIG. 1 as separate programs, it should be understood that such programs can be integrated into a single program or reside on the same client machine.

In the digital asset submission and distribution system 100 shown in FIG. 1, the digital assets are submitted to the digital asset submission and management system 104 by way of the digital asset submission program 116. The digital assets that have been submitted (e.g., via the second client 112 are processed and then stored in the digital asset storage device 106. Thereafter, the stored digital assets are available to be purchased from the digital asset distribution site 102. Upon purchasing a particular digital asset, the digital asset distribution site 102 permits the digital data for the particular digital asset to be retrieved from the digital asset storage device 106 and then delivered (e.g., downloaded) from the digital asset distribution site 102 to the requesting client 110 through the data network 108. In this regard, the digital asset distribution site 102 or some other delivery server (not shown) obtains the digital data corresponding to the particular digital asset from the digital asset storage device 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital asset at the client 110.

The digital asset submission and distribution system 100 allows a user of the client 110 to utilize the network access program 114 to browse, search or sort through a plurality of digital assets that can be purchased from the digital asset distribution site 102. The network access program 114 may also allow the user to preview or demo some or all of a digital asset. In the event that the user of the network access program 114 desires to purchase a particular digital asset, the user (via the network access program 114) and the digital asset distribution site 102 can engage in an online commerce transaction in which the user pays for access rights to the particular digital asset.

The submission and purchase of the digital assets can be achieved over the data network 108. In other words, the submission and purchase of the digital assets can be achieved online. The purchase of media items online can also be referred to as electronic commerce (e-commerce). In one embodiment, the data network 108 includes at least a portion of the Internet. The clients 110, 112 can vary with application but generally are computing devices that have memory storage. Often, the clients 110, 112 are personal computers or other computing devices that are capable of storing and presenting media to their users. In one embodiment, the connections through the data network 108 between the digital asset distribution site 102 and the clients 110, 112 can be through secure connections, such as Secure Sockets Layer (SSL).

Although the digital asset distribution site 102, the digital asset submission and management system 104 and the digital asset storage device 106 are shown in FIG. 1 as being separate components, it should be understood that any of these components can be combined into one or more apparatus. For example, the digital asset submission and management system 104 can be incorporated into the digital asset distribution site 102. As another example, the digital asset storage device 106 can be incorporated into the digital asset distribution site 102 or the digital asset submission and management system 104.

The client (or client device) can, for example, be a computing device. Examples of a computing device include a personal computer (e.g., desktop computer, notebook computer or netbook computer), or a portable handheld electronic device (e.g., Portable Digital Assistant (PDA), multi-function mobile telephone).

Figure 2:
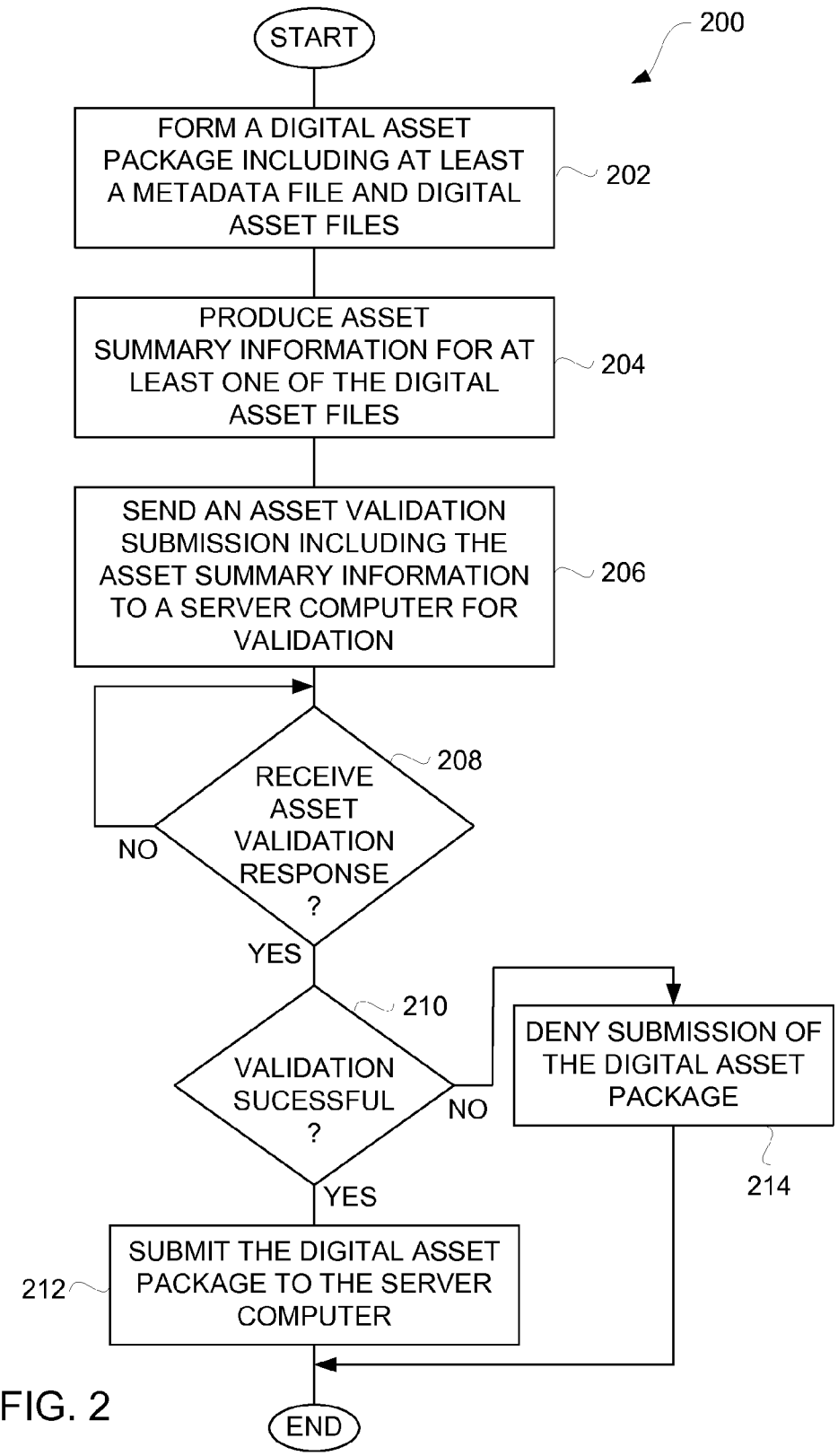
FIG. 2 is a flow diagram of a client validation process according to one embodiment of the invention.

FIG. 2 is a flow diagram of a client validation process 200 according to one embodiment of the invention. The client validation process 200 can, for example, be performed by a computing device, such as the client 112 illustrated in FIG. 1. As an example, the client validation process 200 can be performed by the digital asset submission program 116 operating on the client 112.

The client validation process 200 can form 202 a digital asset package including at least a metadata file and digital asset files. Typically, a user of the computing device can participate in forming the digital asset package by providing metadata and identifying digital assets to be included. To facilitate validation of the digital asset files, at least one summary file for at least one of the digital asset files can be produced 204. Next, an asset validation submission can be sent 206 to a server computer for validation. Here, the asset validation submission that is sent 206 includes the at least one summary file that has been produced 204 for the at least one of the digital asset files.

After the asset validation submission has been sent 206, a decision 208 can determine whether an asset validation response has been received. The server computer can process the asset validation submission and provide an asset validation response. When the decision 208 determines that an asset validation response has not yet been received, the client validation process 200 can await such a response.

Once the decision 208 determines that an asset validation response has been received, a decision 210 can determine whether validation has been successful. In other words, the asset validation response can include an indication of whether or not the validation of the at least one digital asset file within the digital asset package has been successful. When the decision 210 determines that such validation has been successful, the digital asset package may be submitted 212 to the server computer, thereby formally submitting the digital asset package. The formal (or full) submission typically includes the entire digital asset packing such as including the metadata file as well as the digital asset files. On the other hand, when the decision 210 determines that such validation has not been successful, submission of the digital asset package can be denied 214. Following the blocks 212 and 214, the client validation process 200 can end.

Figure 3:
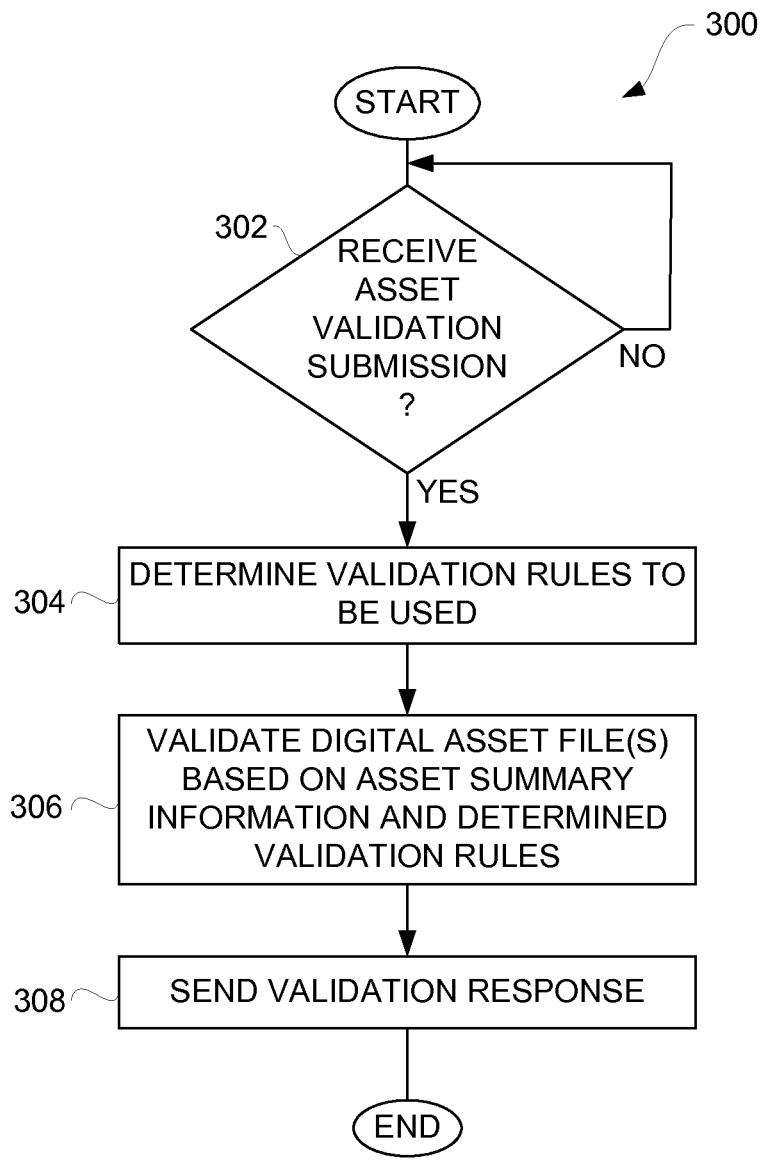
FIG. 3 is a flow diagram of a server validation process according to one embodiment of the invention.

FIG. 3 is a flow diagram of a server validation process 300 according to one embodiment of the invention. The server validation process 300 can, for example, be performed by a server computer, such as the digital asset submission and management system 104 illustrated in FIG. 1 or some other server computer. The server validation process 300 can represent counterpart processing to the client validation process 200 illustrated in FIG. 2.

The server validation process 300 can begin with a decision 302 that determines whether an asset validation submission has been received. Here, the decision 302 determines whether the server computer has received an asset validation submission from a client computing device (e.g., the client device). When the decision 302 determines that an asset validation submission has not been received, the server validation process 300 awaits such a submission. In other words, the server validation process 300 can be deemed invoked when an asset validation submission has been received at the server computer.

In any case, when the decision 302 determines that an asset validation submission has been received, validation rules to be used can be determined 304. Additionally, one or more digital asset files can be validated 306 based on one or more summary files and the determined validation rules. The asset validation submission includes one or more summary files that are used to validate 306 the corresponding one or more digital asset file. After the one or more digital asset files have been validated 306, a validation response can be sent 308 to the client computing device that provided the asset validation submission.

Figure 4A:
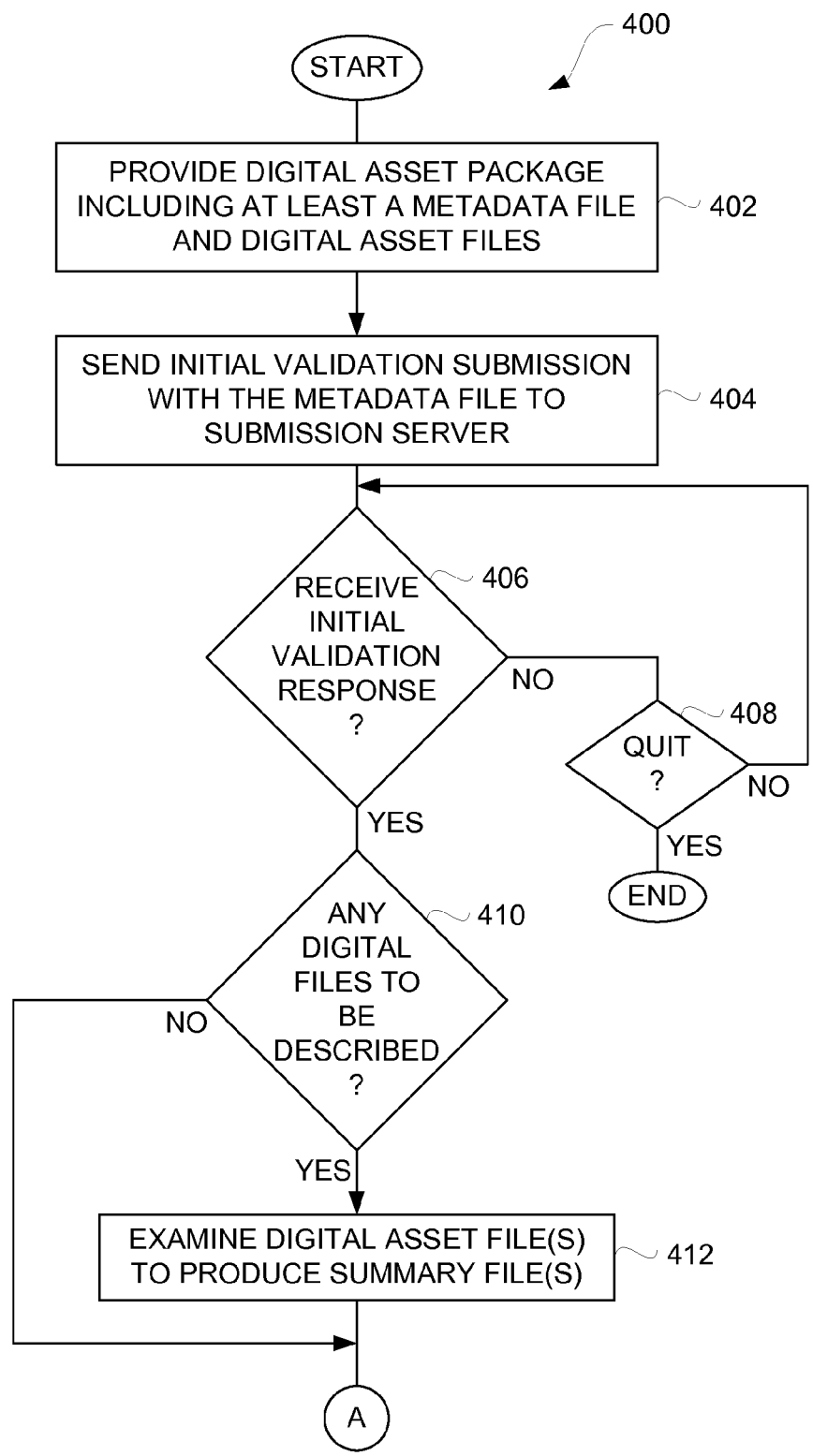
FIGS. 4A and 4B are flow diagrams of a client submission process according to one embodiment of the invention.
Figure 4B:
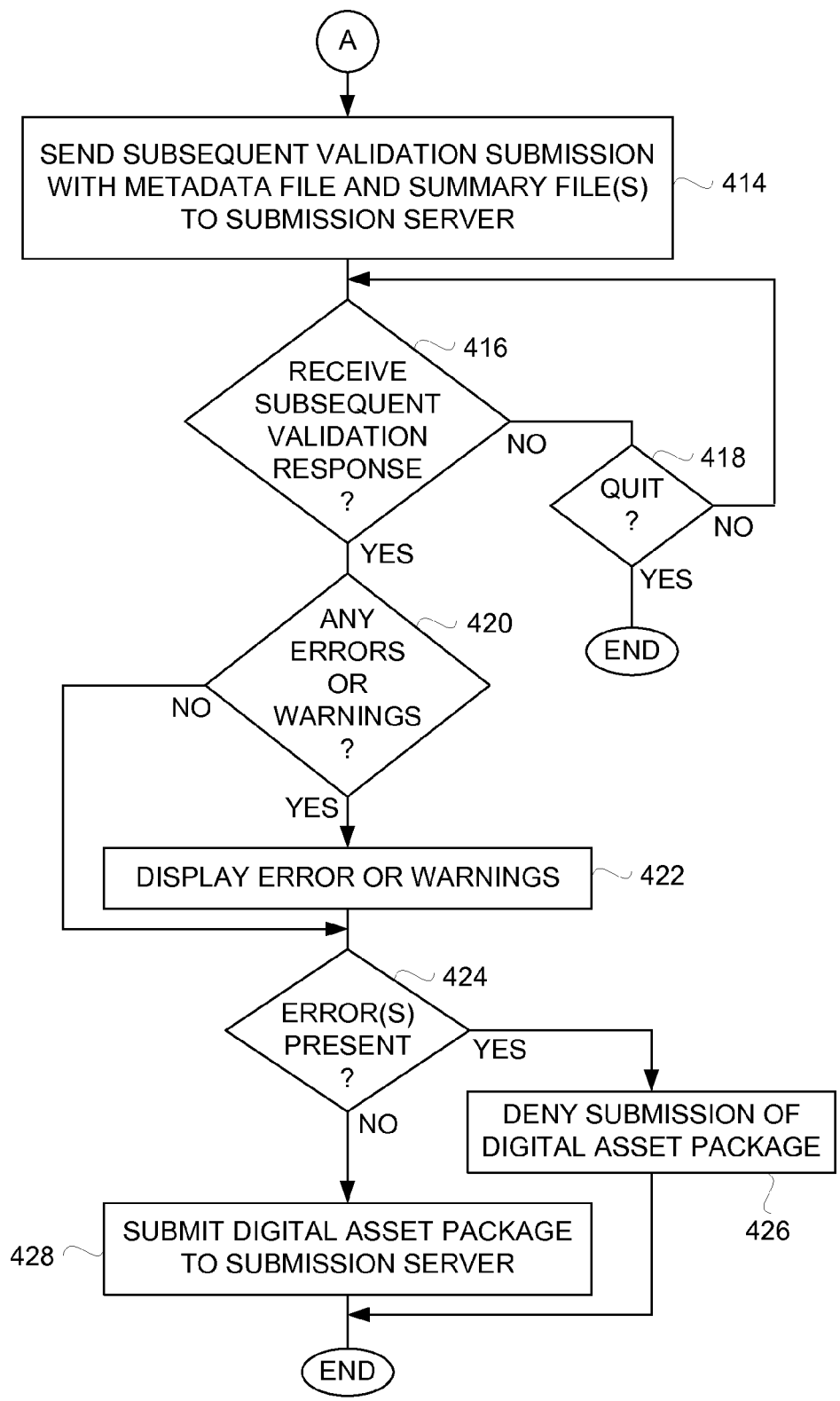

FIGS. 4A and 4B are flow diagrams of a client submission process 400 according to one embodiment of the invention. The client submission process 400 is, for example, performed by a client computing device, such as the client 112 illustrated in FIG. 1.

The client submission process 400 can initially provide 402 a digital asset package that includes at least a metadata file and digital asset files. The digital asset package can be formed at the client computing device or can be formed elsewhere and uploaded to the client computing device. Although the metadata can vary depending on the type of digital media asset, the metadata within the metadata file can, for example, include one or more of: a digital asset type, digital asset title/name, digital asset identifier, a production company, copyright information, release date, supported device type indication, genre indication, version number, artist(s)/actor(s) identifiers, sales start date, file name(s), support information, license agreement information, etc. The digital asset files can, for example, pertain to digital media assets (e.g., media items) or computer program products (e.g., application programs). In forming the digital asset package, one or more digital electronic files can be uploaded to the client computing device.

An initial validation submission with the metadata file can be sent 404 to a submission server. The submission server is a computing device that is utilized to process the validation submission. After the initial validation submission has been sent 404, a decision 406 can determine whether an initial validation response has been received from the submission server. When the decision 406 determines that an initial validation response has not been received, a decision 408 can determine whether the client submission process 400 should quit or end. When the decision 408 determines that the client submission process should quit or end, then the client submission process 400 can end. Alternatively, when the decision 408 determines that the client submission process 400 should not quit or end, the client submission process 400 returns to repeat the decision 406 to await the receipt of an initial validation response.

Once the decision 406 determines that an initial validation response has been received, a decision 410 can determine whether any digital asset files associated with the digital asset package are to be described. For example, the determination can be based on the metadata and/or file extensions for the digital asset files. In one embodiment, the initial validation response provides a list of one or more digital asset files that are to be described at the client computing device for purposes of further validation. When the decision 410 determines that one or more digital asset files are to be described, the one or more digital asset files are then examined 412 to produce one or more summary files. In one embodiment, a single summary file can be utilized to summarize one or more digital asset files. In another embodiment, separate summary files are produced for each of the one or more digital asset files being summarized. The summary files contain information regarding header or content portions of the digital asset files as obtained through examination of such digital asset files. The one or more summary files can be markup language files.

Next, a subsequent validation submission with metadata and one or more summary files can be sent 414 to the submission server. Here, additional validation is being performed or requested with respect to one or more digital asset files of the digital asset package. However, it should be recognized that the digital asset files are not, at this time, being sent to the submission server. Instead, the one or more summary files are provided to the submission server for use in performing validation of the one or more digital asset files.

Next, a decision 416 determines whether a subsequent validation response has been received from the submission server. When the decision 416 determines that a subsequent validation response has not been received, a decision 418 determines whether the client submission process 400 should quit or end. When the decision 418 determines that the client submission process 400 should quit or end, the client submission process 400 can end. On the other hand, when the decision 418 determines that the client submission process 400 should not quit or end, the processing returns to repeat the decision 416 so as to wait a subsequent validation response.

Once the decision 416 determines that a subsequent validation response has been received, a decision 420 can determine whether the subsequent validation response indicates any errors or warnings with respect to the validation of the one or more digital asset files within the digital asset package (namely, those digital asset files that were summarized by a summary file). When the decision 420 determines that there are errors or warnings specified by the subsequent validation response, the errors or warnings can be displayed 422. Here, the errors or warnings can be displayed 422 on a display device associated with the client computing device. Alternatively, when the decision 420 determines that there are no errors or warnings specified by the subsequent validation response, the block 422 can be bypassed.

Following the block 422 or its being bypassed, a decision 420 can determine whether there are any errors present. Specifically, the decision 424 can determine whether the subsequent validation response specifies any errors, namely, validation errors. When the decision 424 determines that there are errors present, the submission of the digital asset package can be denied 426. Alternatively, when the decision 424 determines that there are no errors present, the digital asset package can be submitted 428 to the submission server. At this time, the digital asset package can be transmitted from the client computing device to the submission server over one or more networks. The digital asset package being submitted includes not only the metadata file but also the one or more digital asset files included within the digital asset package. In this case, prior processing has provide for validation of metadata (initial validation) as well as for validation of digital assets (subsequent validation). As such, the digital asset package is only submitted 428 after significant validation has been successfully performed. Following the blocks 426 and 428, the client submission process 400 can end.

Figure 5A:
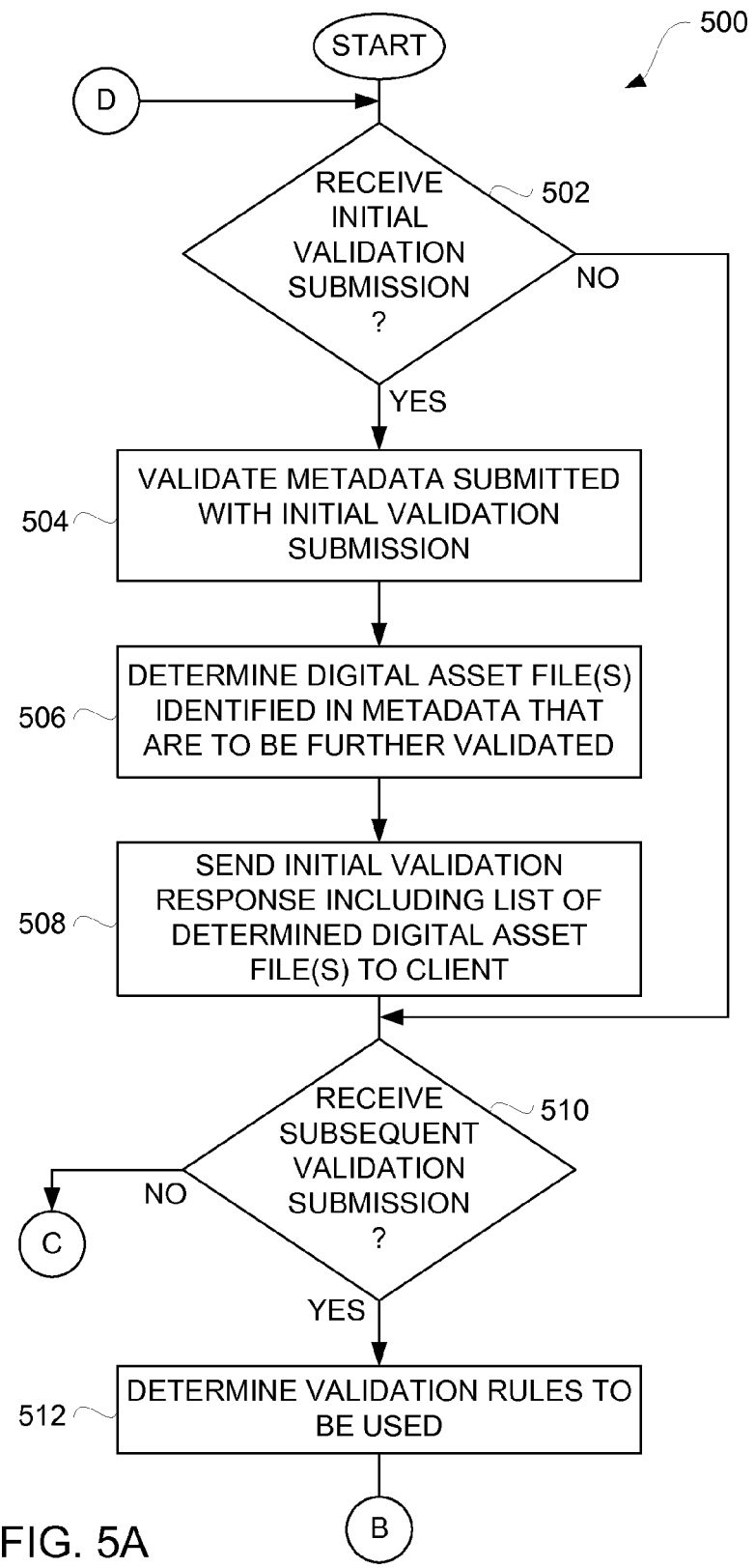
FIGS. 5A-5C are flow diagrams of a server submission process according to one embodiment of the invention.
Figure 5B:
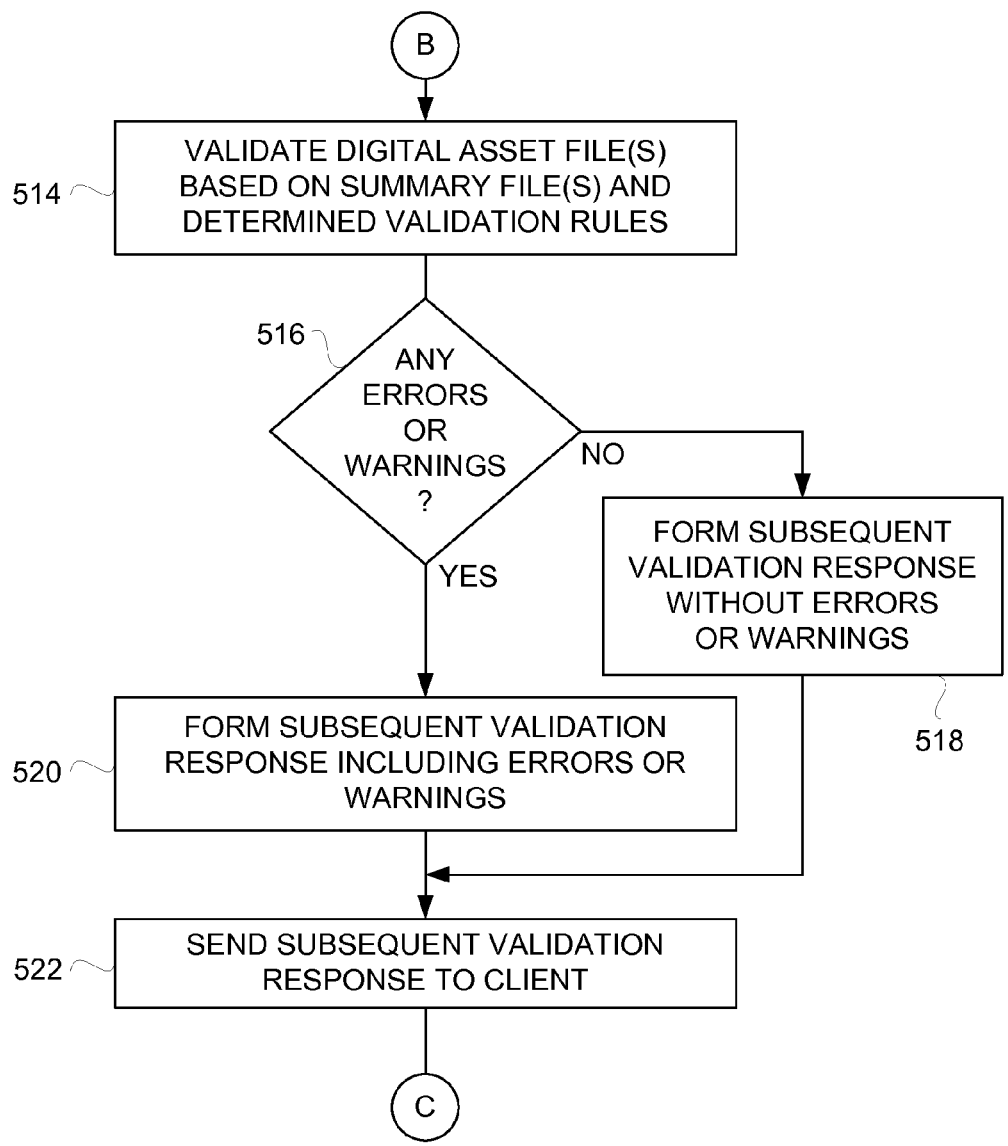
Figure 5C:
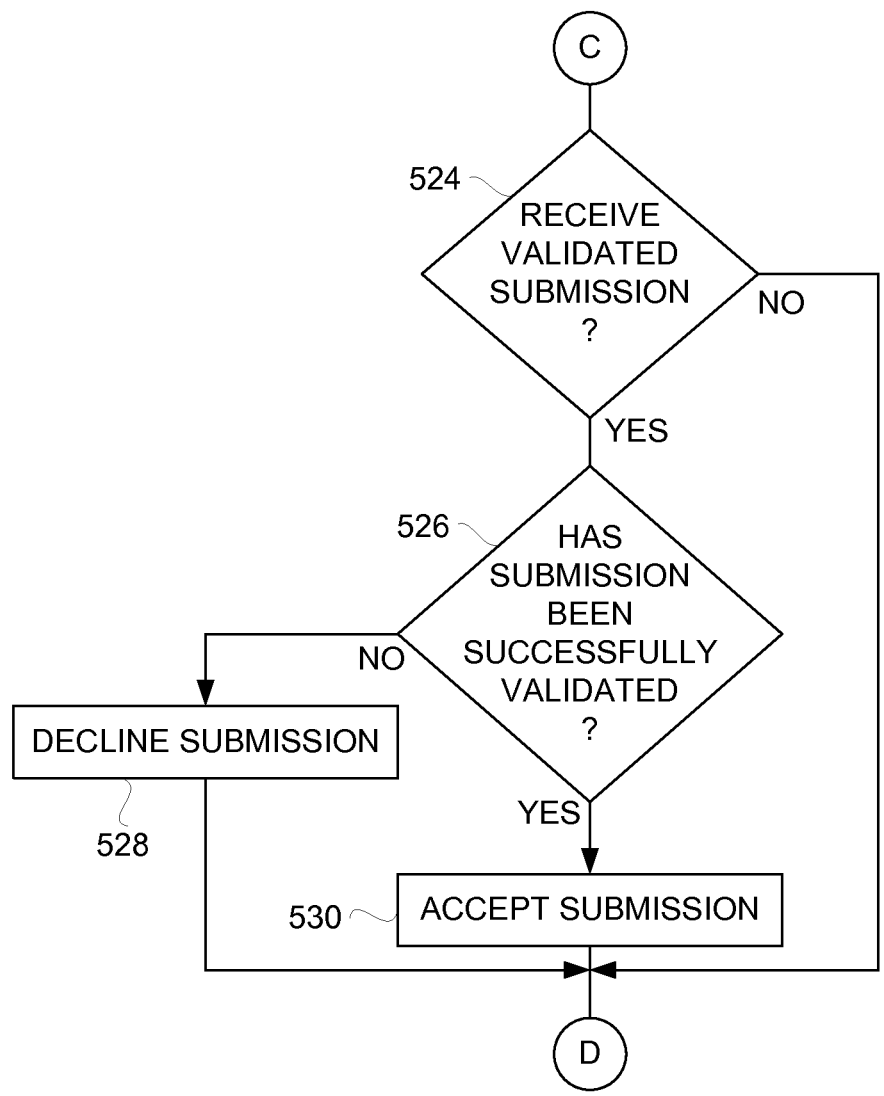

FIGS. 5A-5C are flow diagrams of a server submission process 500 according to one embodiment of the invention. The server submission process 500 can, for example, be performed by a server computer, such as the digital asset submission and management system 104 illustrated in FIG. 1 or some other server computer. The server submission process 500 can represent counterpart processing to the client submission process 400 illustrated in FIGS. 4A and 4B.

The server submission process 500 can begin with a decision 502 that determines whether an initial validation submission has been received. When the decision 502 determines that an initial validation submission has been received (such as from a client computing device), initial validation can be performed at the server computer. Specifically, metadata submitted with the initial validation submission can be validated 504. In addition, one or more digital asset files identified in the metadata that are to be further validated can be determined 506. Here, the server computer can analyze the metadata to decide and identify one or more digital asset files identified therein for which further validation is to be performed. Then, an initial validation response including a list of the determined digital asset files to be further validated can be sent 508 to the client computing device. Further, in the event that in the decision 502 determines that an initial validation submission has not been received, the blocks 504-508 can be bypassed since there is no initial validation to be performed.

Following the block 508 or its being bypassed, a decision 510 can determine whether a subsequent validation submission has been received. Here, the server computer can determine whether a subsequent validation submission has been received from a client computing device. When the decision 510 determines that a subsequent validation submission has been received, the subsequent validation processing can be performed at the server computer. Specifically, validation rules to be used can be determined 512. The validation rules can be determined based on various criteria. For example, the validation rules can be determined 512 based on a type of digital asset to be validated. As another example, the validation rules can be determined 512 based on the submitter of the one or more digital assets. In other words, the validation rules are determined 512 at the server computer but the validation rules can be dependent on one or more criteria, such as type of digital asset, type of submission, particular submitter, and/or type of submitter. Next, the one or more digital asset files can be validated 514 based on the one or more summary files and the determine validation rules. Here, using the determined validation rules, the one or more summary files can be analyzed to determine whether the one or more associated digital asset files can be validated 514. A decision 516 can then determine whether there are any errors or warnings as a result of the validation 514. When the decision 516 determines that there are errors or warnings, a subsequent validation response can be formed 520 including the errors or warnings. Alternatively, when the decision 516 determines that the validation 514 does not result in any errors or warnings, a subsequent validation response can be formed 518 without errors or warnings. Following the blocks 518 and 520, a subsequent validation response can be sent 522 to the client computing device. Further, in the event that the decision 510 determines that a subsequent validation submission has not been received, the blocks 512-522 can be bypassed.

Following the block 522 or its being bypassed, a decision 524 can determine whether a validated submission has been received. When the decision 524 determines that a validated submission has been received, a decision 526 can determine whether the submission has been successfully validated. Here, the submission being received from the client computing device is the submission of the digital asset package. In order for the submission of the digital asset package to be considered, the digital asset package must have been properly validated. In order for the digital asset package to be considered properly validated, the digital asset package must have successfully passed the initial validation as well as the subsequent validation. As noted above, the initial validation primarily concerns validation of the metadata, while the subsequent validation primarily concerns validation of the one and more digital asset files. When the decision 526 determines that the digital asset package being submitted has not been successfully validated, the submission is declined 528. On the other hand, when the decision 526 determines that the digital asset package being submitted has been successfully validated, the submission is accepted 530. Accordingly, the server submission process 500 only permits submission of digital asset packages that have been successfully validated. Following the blocks 528 and 530, as well as following the decision 524 when it is determined that a validated submission has not been received, the server submission process 500 can return to repeat the decision 502 so that additional submissions can be processed in a similar manner.

This application also references and/or incorporates: (1) U.S. patent application Ser. No. 11/712,304, filed Feb. 27, 2007, and entitled "Submission Of Metadata Content And Media Content To A Media Distribution System", which is hereby incorporated herein by reference; (2) U.S. patent application Ser. No. 11/712,303, filed Feb. 27, 2007, and entitled "Processing Of Metadata Content And Media Content Received By A Media Distribution System", which is hereby incorporated herein by reference; and (3) U.S. patent application Ser. No. 12/538,050, filed Aug. 7, 2009, and entitled "Automatic Transport Discovery for Media Submission", which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for validating a digital asset package via at least one server computer, the digital asset package including at least a metadata file and one or more digital asset files, the method comprising:

receiving, from a client device, an initial validation submission including the metadata file;

validating metadata within the metadata file;

determining at least one digital asset file identified in the metadata to be validated;

sending, to the client device, an initial validation response including at least a list of the at least one digital asset file that is to be validated;

receiving, from the client device, a subsequent validation submission including the metadata file and an asset summary file for the at least one digital asset file identified in the list, the subsequent validation submission not including the at least one digital asset file, the asset summary file being different from the at least one digital asset file and from the metadata file but including data pertaining to digital data residing in one or both of a header portion or a data portion of the at least one digital asset file;

determining validation rules to be used in validating the at least one digital asset file;

validating the at least one digital asset file based on the asset summary file and the determined validation rules; and sending, to the client device, a subsequent validation response in accordance with the validating of the at least one digital asset file.

2. A method as recited in claim 1, wherein the list included in the initial validation response identifies a plurality of digital asset files, and wherein the metadata in the metadata file is descriptive of each of the plurality of digital asset files.

3. A method as recited in claim 2, wherein the determining of the validation rules comprises:

determining an asset type for each of the plurality of digital asset files; and determining a different validation rule set for each of the asset types.

4. A method as recited in claim 3, wherein the validating of the at least one digital asset file validates each of the plurality of digital asset files using the validation rules appropriate for the corresponding asset type of the digital asset files.

5. A method as recited in claim 1, wherein the subsequent validation response includes an indication of at least one error or warning with respect to the validation of the at least one digital asset file.

6. A method as recited in claim 1, wherein the determining of the at least one digital asset file identified in the metadata to be validated comprises:

examining the metadata to identify the at least one digital asset file; and determining the at least one digital asset file identified in the metadata based on the examining of the metadata.

7. A method as recited in claim 1, wherein the determining of the at least one digital asset file is based on the metadata and on a file extension for the at least one digital asset file.

8. A method as recited in claim 1, wherein the at least one the digital asset file is a media asset file.

9. A method as recited in claim 1, wherein the method further comprises:

accepting submission, from the client device, of the digital submission if the validating successfully validates the metadata as well as the at least one digital asset file.

10. A method as recited in claim 1, wherein submission of the digital asset package undergoes (i) validation of the metadata following the initial validation submission and then (ii) validation of the at least one digital asset file following the subsequent validation submission.

11. A method as recited in claim 1, wherein the list included in the initial validation response identifies a plurality of digital asset files, wherein the metadata in the metadata file is descriptive of each of the plurality of digital asset files, wherein the determining of the validation rules comprises:

determining an asset type for each of the plurality of digital asset files; and determining a different validation rule set for each of the asset types, and wherein the validating of the at least one digital asset file validates each of the plurality of digital asset files using the validation rules appropriate for the corresponding asset type of the digital asset files.

12. A method as recited in claim 11, wherein the method further comprises:

accepting submission, from the client device, of the digital submission if the validating successfully validates the metadata as well as the at least one digital asset file.

13. A non-transitory computer readable medium including at least computer program code stored thereon for validating a digital submission to at least one server computer via a data network, the digital submission including at least a metadata file and at least one digital asset file, the non-transitory computer readable medium comprising:

computer program code for receiving a metadata validation submission including the metadata file;

computer program code for validating metadata within the metadata file;

computer program code for determining the at least one digital asset file identified in the metadata to be validated;

computer program code for sending a metadata validation response including at least a list of the at least one digital asset file that is to be validated;

computer program code for subsequently receiving an asset validation submission including the metadata file and an asset summary file for the at least one digital asset file, the asset validation submission not including the at least one digital asset file, the asset summary file being different from the at least one digital asset file but including data pertaining to digital data residing in one or both of a header portion or a data portion of the at least one digital asset file;

computer program code for determining validation rules to be used in validating the at least one digital asset file;

computer program code for validating the at least one digital asset file based on the asset summary file and the determined validation rules; and computer program code for sending a validation response based on the validating of the at least one digital asset file by the computer program code for validating the at least one digital asset file.

14. A non-transitory computer readable medium as recited in claim 13, wherein the non-transitory computer readable medium further comprises:

computer program code for accepting submission, from the client device, of the digital submission if the computer program code for validating successfully validates the at least one digital asset file.

15. A method for submitting a digital asset package to a network-based server computer for validation, the method comprising:

forming a digital asset package including at least a metadata file and digital asset files, each of the digital asset files including at least a header portion and a data portion;

sending an initial validation submission including the metadata file to the server computer;

receiving an initial validation response from the server computer, the initial validation response including at least a list of at least one digital asset file that is to be described;

producing at least one summary file for the at least one digital asset file that is to be described, the at least one summary file being distinct from the at least one digital asset file and the producing of the at least one summary file including examining digital data residing in the header portion and the data portion of the at least one digital asset file;

sending a subsequent validation submission including the at least one summary file to the server computer, the subsequent validation submission not including the at least one digital asset file;

receiving a subsequent validation response from the server computer, the subsequent validation response including an indication of whether at least the at least one digital asset file has been successfully validated; and thereafter submitting the digital asset package to the server computer if the subsequent validation response indicates that at least the at least one digital asset file has been successfully validated.

16. A method as recited in claim 15, wherein the producing of the at least one summary file includes examining digital data within the at least one digital asset file.

17. A method as recited in claim 15, wherein the at least one summary file is a markup language file.

18. A method as recited in claim 15,
wherein the initial validation response includes at least a list of a plurality of digital asset files to be described, and
wherein the producing produces a separate summary file for each of the plurality of digital assets.

19. A method as recited in claim 15, wherein the submitting of the digital asset package to the server computer causes (i) validation of the metadata following the initial validation submission and then (ii) validation of the at least one digital asset file following the subsequent validation submission.

20. A method as recited in claim 15, wherein the digital asset package including at least one digital asset file.

21. A non-transitory computer readable medium including at least computer program code stored thereon for submitting a digital asset package to a network-based server computer for validation, the non-transitory computer readable medium comprising:

computer program code for forming a digital asset package including a metadata file and digital asset files, each of the digital asset files including at least a header portion and a data portion;

computer program code for sending a metadata validation submission including at least a list of the digital asset files that are to be validated;

computer program code for producing at least asset summary file for at least one of the digital asset files of the digital asset package, the at least one summary file being different from the at least one digital asset file, and the at least one asset summary file being produced using computer program code for examining digital data residing in one or both of the header portion or the data portion of the at least one digital asset file;

computer program code for sending a subsequent asset validation submission including the asset summary file to the server computer, the asset validation submission not including the at least one digital asset file;

computer program code for receiving an asset validation response from the server computer, the asset validation response including an indication of whether at least the at least one digital asset file has been successfully validated at the server computer based on the asset summary file; and computer program code for submitting the digital asset package to the server computer if the asset validation response indicates that at least the at least one digital asset file has been successfully validated.

22. A media system, comprising:
a digital package submission subsystem configured to submit a digital asset package; and
a digital package reception subsystem configured receive and process to the digital asset package that has been submitted,
wherein the digital package submission subsystem and the digital package reception system are operatively connectable via a computer data network,
wherein the digital package submission subsystem includes at least one computing device having a processor and memory and is configured to at least:
  form a digital asset package including a metadata file and digital asset files, each of the digital asset files including at least a header portion and a data portion;
  sending a metadata validation submission including at least a list of the digital asset files that are to be validated;
  produce at least asset summary file for at least one of the digital asset files of the digital asset package, the at least asset summary file being different from the at least one digital asset file and the producing of the at least asset summary file including examining digital data residing in the header portion and the data portion of the at least one digital asset file;
  send a subsequent asset validation submission including the asset summary file to the digital package reception subsystem, the asset validation submission not including the at least one digital asset file;
  receive an asset validation response from the digital package reception subsystem, the asset validation response including an indication of whether at least the at least one digital asset file has been successfully validated at the digital package reception subsystem based on the asset summary file; and
  submit the digital asset package to the server computer if the asset validation response indicates that at least the at least one digital asset file has been successfully validated, and
wherein the digital package reception subsystem includes at least one computing device and is configured to at least:
  receiving a metadata validation submission including the metadata file;
  validating metadata within the metadata file;
  determining the at least one digital asset file identified in the metadata to be validated;
  sending a metadata validation response including at least a list of the at least one digital asset file that is to be validated;
  subsequently receive an asset validation submission including at least the metadata file and the asset summary file for the at least one digital asset file;
  determine validation rules to be used in validating the at least one digital asset file;
  validate the at least one digital asset file based on the asset summary file and the determined validation rules; and send a validation response in accordance with the validating of the at least one digital asset file by the computer program code for validating the at least one digital asset file.

* * * * *